United States Patent [19]

Landa et al.

[11] Patent Number: 4,967,890

[45] Date of Patent: Nov. 6, 1990

[54] CLUTCH PLATE

[76] Inventors: David Landa, P.O. Box 9; Sanford Landa, P.O. Box 1732, both of Highland Park, N.J. 08902

[21] Appl. No.: 417,581

[22] Filed: Oct. 5, 1989

[51] Int. Cl.⁵ .............................................. F16D 13/68
[52] U.S. Cl. .............................. 192/70.2; 192/107 R; 188/218 XL; 403/359; 428/579
[58] Field of Search ................. 192/70.16, 70.19, 70.2, 192/107 R; 188/73.1, 73.2, 218 XL; 403/359, 375; 428/579

[56] References Cited

U.S. PATENT DOCUMENTS 3,760,921 9/1973 Gillespie ...................... 192/70.2 X

FOREIGN PATENT DOCUMENTS 2459031 6/1976 Fed. Rep. of Germany ..... 192/70.2

*Primary Examiner*—Richard Lorence
*Attorney, Agent, or Firm*—Mathews, Woodbridge & Collins

[57] ABSTRACT

The present invention is an improved disc useful as a clutch plate. The disc has a major surface, preferably a flat planar surface, and a hole, having a hole circumference, through the disc at the major surface. Preferably the disc is circular with a concentric hole. The disc further comprises at least one tooth and preferably a plurality of teeth coplanar with the major plane of the disc, and extending from the hole circumference. Each tooth has at least one, and preferably two tooth side edges extending from the hole circumference. Preferably, there are a plurality of the same shaped teeth distributed uniformly along the hole circumference. There is a tab extending at an angle, preferably perpendicular to the major plane from at least part of at least one tooth edge. Preferably a tab extends from each tooth edge.

12 Claims, 3 Drawing Sheets

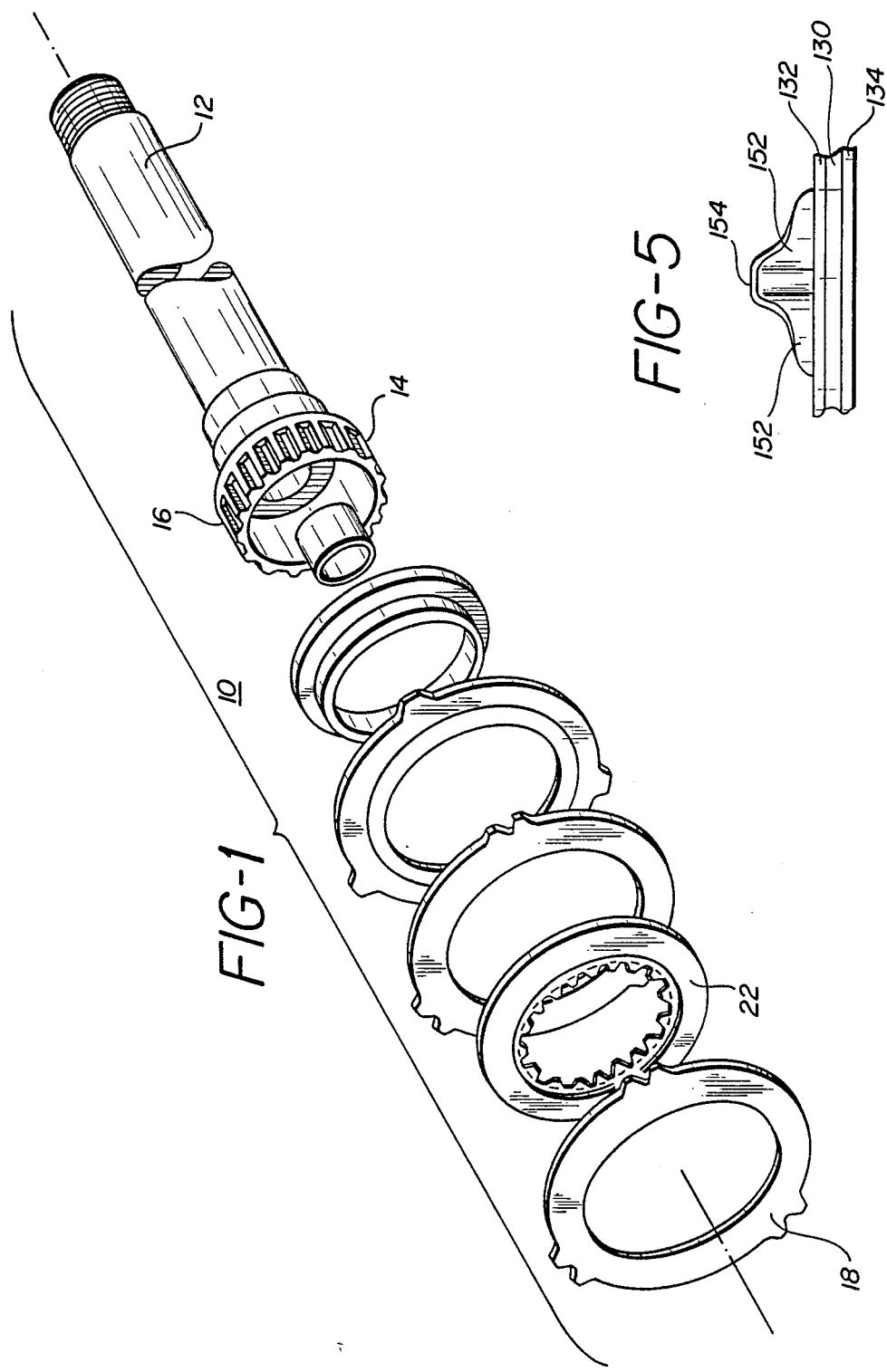

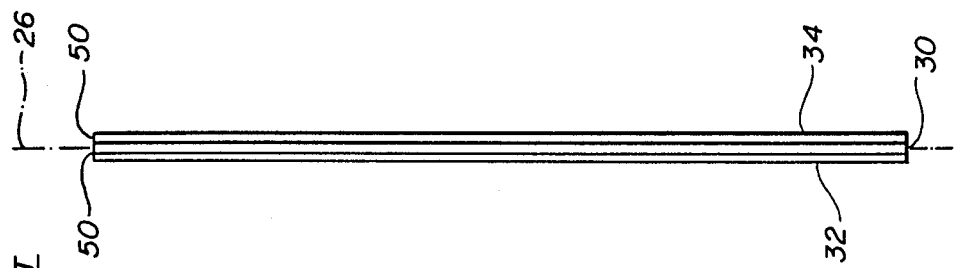
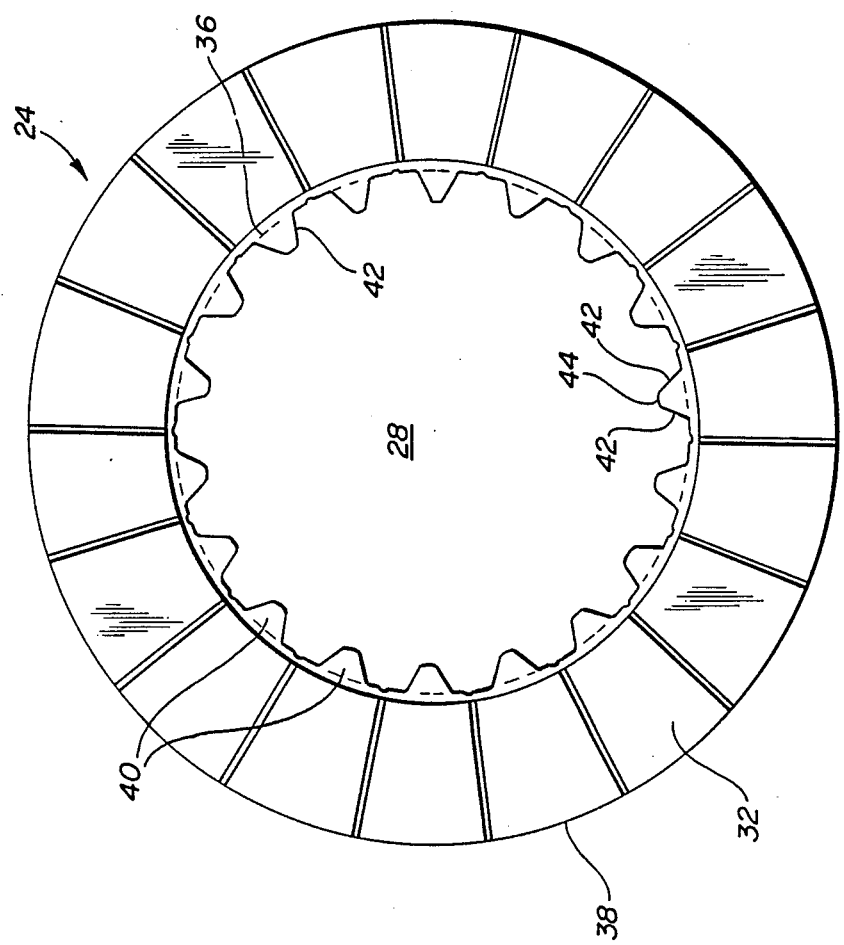

ved clutch plate of the present invention. The automatic transmission assembly 10 comprises a transmission shaft 12 having a splined hub 14 attached at one end. The hub 14 is preferably coaxial with the shaft. The hub has a splined surface. By a splined surface it is meant that the surface a series of uniformly spaced ridges or splines 16 parallel to the axis of the hub. A series of friction plates

CLUTCH PLATE

BACKGROUND OF THE INVENTION

The present invention is in the field of automatic transmissions; more particularly the present invention relates to an improved clutch plate for use in an automatic transmission of an automobile.

Automatic transmissions for automobiles comprise a housing, means within the housing to transmit the rotation and power from the motor to the driveshaft of the automobile. Power and rotation are transmitted in part via a series of engageable friction plates such as friction or clutch plates.

In a typical assembly, a clutch plate is mounted on a splined hub at the end of a rotatable shaft. The clutch plate is a circular disc having concentric hole. There are a plurality of teeth in plane of the disc extending from the inner circumference of the hole toward the center of the disc. The teeth are designed to match the space between the splines on the hub. As the hub rotates the clutch plate rotates with it. The clutch plate has two faces, a front face and a back face. Typically, a layer of friction-resistant material such as friction paper as is known in the art is located on both the front face and the back face between the inner and outer circumferences of the disc. Upon engagement at least one rotating friction plate is pressed against another surface of a rotatable article, i.e. a steel plate causing the steel plates to rotate. The rotation and power is transmitted from the rotating shaft through the clutch plate. A typical apparatus is made by the General Motors Corporation and is known as a GM TH 440-T4 ME-7 transmission. This is described at page 40 of Automatic Transmission Parts Catalog 1988, printed by Transmission Industry Publication, Inc., Fresno, Calif. (1987), hereby incorporated by reference.

In such transmissions the clutch plate is mounted on a splined hub. For a variety of reasons including the method to make the splined hub, the hub is usually made of a softer metal than the clutch plate disc. The hub can be made by deep-drawing cold-rolled steel. The hub is made of a steel such as SAE 1008 type steel, and the disc is typically made of steel such as SAE 1020 type steel. There is usually a small clearance space between the teeth of the disc and the spline of the hub. Upon initiation of rotation and engagement of the clutch, the edges of the disc teeth impact the surface of the splines. The differences in hardness between the hub and the disc, and the thinness of the disc result in the scoring and eventually cutting the splines. Total failure results when the hub is actually cut or sliced off by the teeth of the disc.

SUMMARY OF THE INVENTION

The present invention is an improved disc useful as a clutch plate. The disc has a major surface, preferably a flat planar surface, and a hole, having a hole circumference, through the disc at the major surface. Preferably the disc is circular with a concentric hole. The disc further comprises at least one tooth and preferably a plurality of teeth coplanar with the major plane of the disc, and extending from the hole circumference. Each tooth has at least one, and preferably two tooth side edges extending from the hole circumference. Preferably, there are a plurality of the same shaped teeth distributed uniformly along the hole circumference There is a tab extending at an angle, preferably perpendicular to the major surface from at least part of at least one tooth edge. Preferably a tab extends from each tooth edge.

A preferred embodiment of the present invention is a clutch plate comprising the disc. The clutch plate is a planar disc having a major plane, a hole with a hole circumference, a front face and back face, and at least one tooth coplanar with the major plane and extending from the hole circumference. Preferably, the disc is circular and the hole is a concentric circle. There are preferably a plurality of the same shaped teeth distributed uniformly along the hole circumference. The teeth extend from the circumference of the hole toward the center. Each tooth has at least one tooth edge, and preferably two tooth edges extending from the circumference of the hole. A tab extends from at least part of at least one tooth edge at an angle to the major plane. Preferably, the tabs extend from only one face. The teeth preferably have two side edges extending from the hole circumference at an angle of from about 15° to 90° and preferably 45° to 90° to a base line between the two edges at their intersection with the hole circumference. The teeth are preferably substantially quadralaterals and more preferably trapezoids having a base generally along the hole circumference, sides which are the tooth side edges and a top edge connecting the sides opposite the base. The base of the trapezoid is preferably longer than the top. The teeth can also be rectangular. At least one tab extends from at least one side edge of one tooth. Preferably there are tabs extending from all of the side edge and more preferably from all of the side and top edges. The tabs preferably extend from one face.

The present invention includes a transmission assembly comprising a splined hub and a clutch plate as recited above. The present invention is particularly useful where the splined hub is made of a softer material than the teeth of the disc.

BRIEF DESCRIPTION OF THE DRAWINGS

FIG. 1 is an exploded view showing the assembly of part of an automatic transmission for a General Motors TH 440-T4 ME-9 transmission including the clutch plate of the present invention.

FIGS. 2 and 3 are the front and edge views of a prior art clutch plate useful for a GM TH440-T4 ME-9 transmission without the improvement of the present invention.

FIGS. 4–6 are respectively the front, edge and partial sectional view of a clutch plate of the present invention for a GM TH 440-T4 ME automatic transmission.

DETAILED DESCRIPTION OF THE PREFERRED EMBODIMENTS

Figure 6:
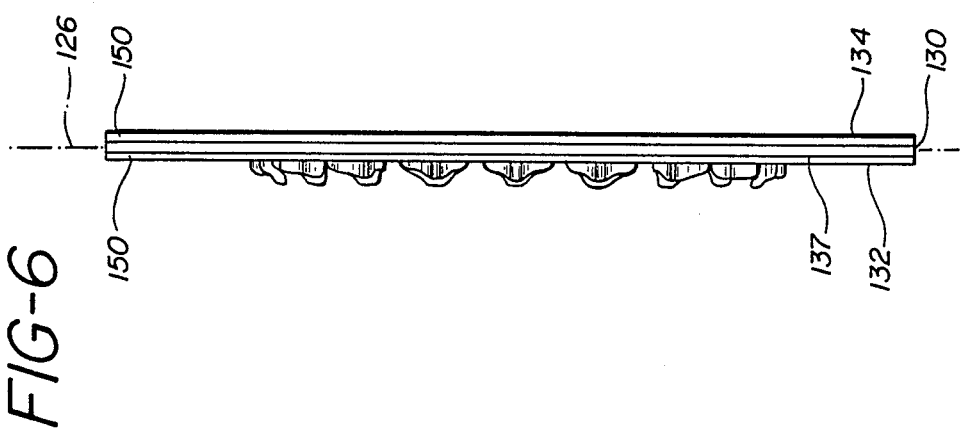

The present invention is a disc and improved clutch plate useful in automatic transmissions. The improved clutch plate of the present invention will be illustrated by reference to a General Motors automatic transmission, GM TH 44-T4 ME-9.

FIG. 1 illustrates a portion of the GM TH 44-T4 ME-9 automatic transmission including the impro and steel plates having openings which fit on the splined hub are shown in FIG. 1. When the series of plates are pressed together the rotation of the shaft 12 is transmitted through clutch plate 22 to front mating plate 18 and transferred, in part, this way from the motor to the driveshaft of the automobile.

A prior art clutch plate is illustrated in FIGS. 2 and 3. The prior art clutch plate 24 comprises a circular disc 30 having a major plane 26 and a concentric hole 28 through major plane 26 of the disc 30. The disc 30 has a front face 32 and a back face 34. The hole 28 has a hole circumference 36. The disc 30 has an outer circumference 38. There are a plurality of teeth 40 with each tooth extending from the hole circumference 36 toward the center of the hole and having at least one tooth edge 42. The teeth are the same size and evenly distributed along hole circumference 36. The teeth are trapezoidal shaped wherein the sides of the trapezoid are tooth edges 42 and the top of the trapezoid is top edge 44 generally circumferencial in direction. The base 43 of the trapezoid is located at the hole circumference 36 and extends between the intersection of the two sides 42 and the hole circumference. The base angle 46 between the tooth edge and the base of the trapezoid is approximately 60°. The height of each tooth is approximately 0.5 centimeters from the top edge 44 to the base 43 along a radial line. Layers of a friction paper 50 are attached to front face 32 and back face 34 of the disc 30 between the hole circumference 36 and the outer circumference 38.

The disc is approximately 1.5 millimeters thick and the friction paper 50 is approximately 0.5 millimeters thick. The disc is made of steel, grade SAE 1020. The teeth 40 are designed to correspond to the circumferencial shape of spined hub 16. The hub is made of deep drawn steel, i.e. (SAE 1008) which is softer than SAE 1020 steel used to make disc 30. During operation of an automatic transmission having prior art clutch plate 24 the spined hub is scored by the teeth 40; and eventually the teeth 40 actually cut off a portion of splined hub 16 resulting in failure of the automatic transmission.

Figure 4:
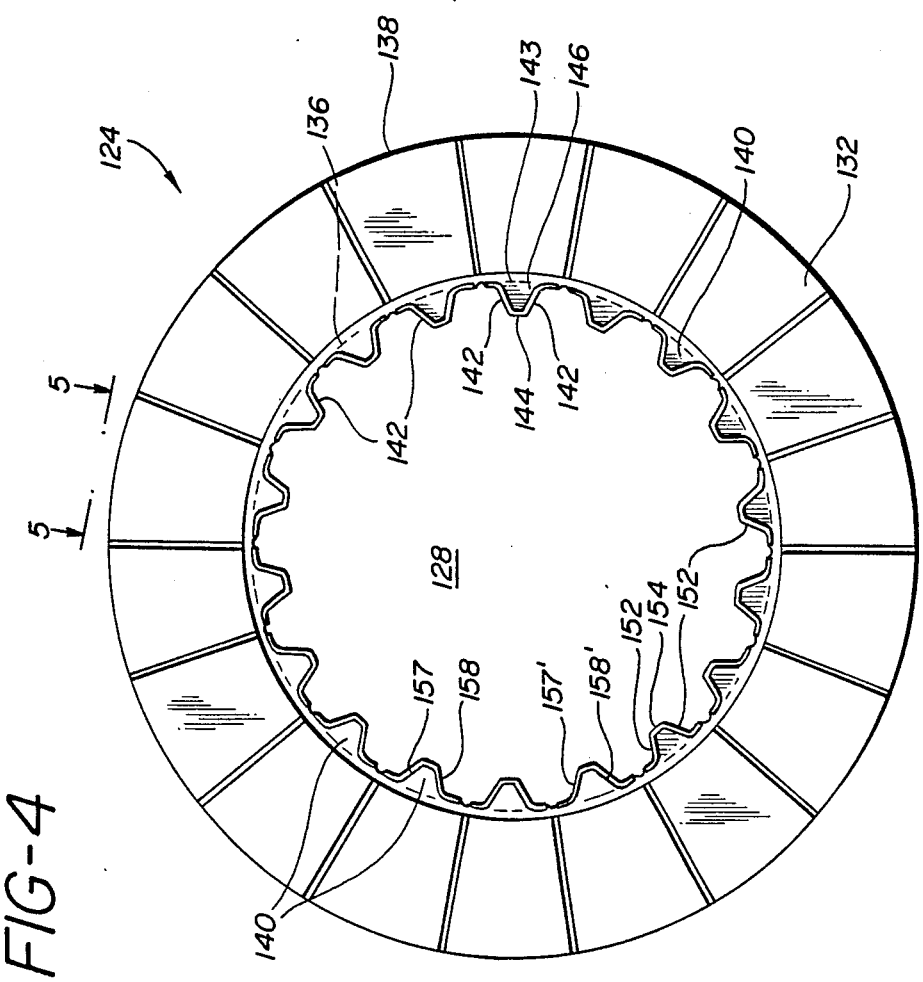

The present invention is an improved clutch plate design generally shown in FIGS. 4–6. Common elements of the clutch plate of the present invention have the same reference characters as prior art clutch plate (FIGS. 2 and 3) plus 100. Reference is made to the corresponding description above. The clutch plate 124 has a major clutch plate plane 126. There is a hole 128 through the clutch plate 124. The clutch plate has a clutch plate disc 130 having a front face 132 and a back face 134.

In a preferred embodiment the clutch plate disc 130 has a circular hole 128 having a hole circumference 136 and an outer circumference 138 which preferably is circular and concentric with circular hole 128. The disc 130 preferably has a friction means such as friction paper 150 attached to the front face 132 and/or the back face 134 by suitable means such as adhesives. The friction means is located between the hole circumference 136 and outer circumference 138.

There is at least one tooth 140 extending from the hole circumference 136 coplanar with the major plane 126. The tooth has at least one tooth edge 142 extending from the hole circumference 136 toward the hole 128.

The tooth edges 142 which extend from hole circumference 136 at an angle 146 of from 15° to 90° from baseline 143 which is generally along the hole circumference 136. The angle 146 is preferably 45° to 90°.

Preferably the tooth is substantially quadralateral. The sides of the quadralateral are tooth edges 142, baseline 143 is the base, and the top edge 144 connects the sides. The teeth 140 preferably have two side edges 142 extending from the hole circumference at an angle of from about 15° to 90° and preferably 45° to 90° to a baseline 143 between the two side edges 142 at their intersection with the hole circumference 136. The teeth are preferably trapezoids having a base, baseline 143 which is generally along the hole circumference 136, sides which are the tooth side edges 142 and a top edge 144 connecting the side edges opposite the base 143. The base 143 of the trapezoid is preferably longer than the top 144. Alternatively, the teeth can be triangular or rectangular in shape.

Preferably there are a plurality of teeth, preferably 5 to 100, more preferably 5 to 50, and most preferably 10 to 25 teeth, evenly spaced around the hole circumference 136 located to fit into the spaces between the splines on splined hub 16. Preferably the teeth are the same size and shape.

There is an edge tab 152 extending at an angle to the major surface, i.e. major plane 126, from at least part of at least one tooth side edge 142. Preferably, the edge tab 152 extends substantially perpendicular to the major plane 126 to the disc. Preferably, a plurality of edge tabs 152 extend from a plurality of teeth 140. Most preferably, each tooth has an edge tab 152 extending from each tooth edge 142 and a top edge tab 154 extending from top edge 146. In the most preferred embodiment tabs 152 and 154 extend from all side edges 142 and base edge 144 substantially along the whole length of each edge.

Where all of the edges 142 do not have tabs, each tooth is considered to have a clockwise tooth edge 157 and a counterclockwise tooth edge 158. The clockwise edge 157 being the first edge of a tooth as the disc rotates in the clockwise direction, and a counterclockwise edge 158 being the first edge as the disc rotates in the counterclockwise direction. Where all of the edges 142 do not have tabs, preferably at least one clockwise edge 157 has a clockwise edge tab 157' and at least one counterclockwise edge has counterclockwise edge tab 158'.

The height of the tabs above the surface, i.e. front face 132 depends on factors such as the composition of the hub and disc, the diameter of the disc, and the size of the teeth, and the operating conditions of the transmission. It is preferred that the height of the tab be at least as high as the thickness of the disc 130. The length of the combination of the disc thickness and the tab height should be sufficient so that during normal transmission operation the splined hub 116 is not scored or cut by the tabbed edges of the teeth 140. The distance from the surface, i.e. front surface 137, of the disc 130 to the height of a tab can be any suitable height and is typically up to 0.5 inches, preferably from 0.01 to 0.5, and more preferably from 0.05 to 0.25 inches high. The distance of the height of the tab to the surface 137 of the disc can vary along the edge as illustrated in the disc shown in FIGS. 5 and 6. The edge tabs 152 beginning at the base 143 have no height and increase to the height of top edge tab 154.

Discs can be made out of suitable material depending on their end use. Such materials include metal such as steel, composites of copolymers and fibers, as well as polymers alone, such as nylon. Preferably the discs are made of metals such as cast aluminum and more preferably steel. A useful and preferred disc material for discs used in automatic tranmissions are steel such as tested and listed in Materials Engineering, Material Selector 1989, published by Penton Publishing, December 1988, at. Ch. 1, beginning at p. 31, Irons and Steel. The most preferred steel used is a carbon steel AISI type 1020.

The size of the disc or final clutch plate can vary depending on the size transmission assembly and size of the hub and shaft on which it is matched. The clutch plate illustrated in FIGS. 4-6 are approximately to scale. This clutch plate has outer circumference 138 being circular with a diameter of approximately 5½ inches and an inner circumference 136 having a dimater of approximately 3⅜ inches. The tooth height from the inner circumference to the top edge 144 is approximately 3/16 in. The length of the base edge of each trapezoidal tooth is approximately 5/16 in. and the top edge is approximately 3/16 in. The clutch plate is useful in a GM TH 440-T4 ME-9 transmission assembly.

Modification, changes and improvements to the preferred forms of the invention herein disclosed, described and illustrated may occur to those skilled in the art who come to understand the principles and precepts thereof. Accordingly, the scope of the patent to be issued here should not be limited to the particular embodiments of the invention set forth herein, but rather should be limited by advance of which the invention has promoted the art.

What is claimed is:

1. A circular disc having a major surface, and a concentric hole having a hole circumference through the disc at the major surface, said major surface being a flat planar surface having a major plane, the disc further comprising a plurality of trapezoidal shaped teeth extending from the circumference of the hole, each of said teeth having two side edges and one top edge; and
    a tab extending from each of the side and top edges at an angle generally perpendicular to the major plane.

2. The disc according to claim 1 wherein the tabs extending from each of the side edges are continuous with the tab extending from the top edge.

3. A clutch plate comprising a circular disc having a major plane and a concentric hole having a hole circumference, a front face, a back face, and a plurality of teeth in the major plane extending from the circumference of the hole, each of the teeth having sides edges extending from the circumference of the hole and a top edge connected to the sides edges; and
    a tab extending from each of the side and top edges at an angle generally perpendicular to the major plane.

4. The clutch plate of claim 3 wherein the tabs extend from one face.

5. The clutch plate of claim 3 wherein the teeth have side edges extending from the hole at an angle of from 45° to 90° to a baseline at the hole circumference.

6. The clutch plate of claim 5 wherein said at least one tooth is substantially quadralateral, having a base which is at the circumference of the hole, sides which are tooth edges, and a top edge connected to the sides.

7. The clutch plate of claim 6 wherein said at least one tooth is substantially a trapezoid with the base being longer than the top.

8. The clutch plate of claim 6 wherein said tooth is rectangular.

9. The clutch plate of claim 3 wherein the tabs extending from each of the side edges are continuous with the tab extending from the top edge.

10. A transmission assembly comprising a splined hub having a plurality of splines, there being a space between adjacent splines; and a clutch plate comprising a circular disc having a major plane and a concentric hole having a hole circumference with a plurality of teeth extending toward the center of the hole from the hole circumference, the teeth in a shape complimentary to the spaces between the splines, each of the teeth having sides edges extending from the hole circumference, and a top edge connected to the side edges, and
    a tab extending from each of the side and top edges.

11. The assembly of claim 10 wherein the hub is made of a softer material than the disc.

12. The assembly of claim 10 wherein the tabs extending from each of the tooth edges are continuous with the tab extending from the top edge.

* * * * *